US007895196B2

(12) United States Patent
Mahadevan et al.

(10) Patent No.: US 7,895,196 B2
(45) Date of Patent: Feb. 22, 2011

(54) COMPUTER SYSTEM FOR IDENTIFYING STORYLINES THAT EMERGE FROM HIGHLY RANKED WEB SEARCH RESULTS

(75) Inventors: Uma Mahadevan, Cupertino, CA (US); Shanmugasundaram Ravikumar, Cupertino, CA (US); Dandapani Sivakumar, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 1574 days.

(21) Appl. No.: 10/835,983

(22) Filed: Apr. 30, 2004

(65) Prior Publication Data

US 2005/0246321 A1 Nov. 3, 2005

(51) Int. Cl.
*G06F 17/30* (2006.01)
(52) U.S. Cl. .................................................. 707/728
(58) Field of Classification Search .................. 707/2, 707/3, 722–730
See application file for complete search history.

(56) References Cited

U.S. PATENT DOCUMENTS

2003/0203343 A1 10/2003 Milner

OTHER PUBLICATIONS

WiseNut, "WiseNut. Search. Exactly.", Nov. 25, 2003, http://www.wisenut.com, pp. 1-4.*
K. Bharat and M. Henzinger. Improved Algorithms for Topic Distillation in a Hyperlinked Environment. In Proceedings of the 21st Annual International ACM SIGIR Conference on Research and Development in Information Retrieval, pp. 104-111,1998.
S. Brin and L. Page. The Anatomy of a Large-Scale Hypertextual Web Search Engine. In Proceedings of the 7th International World Wide Web Conference, pp. 107-117,1998.
J-Y. Cai. On the Impossibility of Certain Ranking Functions. International Mathematical Journal, 3(2):119-128, 2003.
T. Calishain. Clustering With Search Engines. http://www.llrx.com/features/clusteringsearch.htm.
S. Chakrabarti, B. Dom, D. Gibson, R. Kumar, P. Raghavan, S. Rajagopalan, and A. Tomkins. Spectral Filtering for Resource Discovery. In Proceedings of the ACM SIGIR Workshop on Hypertext Analysis, pp. 13-21,1998.
D. R. Cutting, D. R. Karger, J. O. Pedersen, and J. W. Tuckey. Scatter/gather: A Cluster-Based Approach to Browsing Large Document Collections. In Proceedings of the 15th International ACM SIGIR Conference on Research and Development in Information Retrieval, pp. 318-329,1992.

(Continued)

*Primary Examiner*—Neveen Abel Jalil
*Assistant Examiner*—Farhan M Syed
(74) *Attorney, Agent, or Firm*—Gibb I.P. Law Firm, LLC

(57) ABSTRACT

This disclosure provides a method of and service for searching for locations (e.g., web sites) on a network (e.g., the internet). The method begins by inputting a query from a user and searching the internet based on the query to produce search results (comprising web sites) in an order of relevance, where more relevant results are ordered ahead of less relevant results. However, rather than directly reporting the search results to the user as conventional search methodologies do, the invention reorganizes the search results into storylines. More specifically, the invention identifies focused vocabularies from the search results, where each focused vocabulary forms a separate storyline. In addition, the invention maximizes the number of search results that are included in each storyline, minimizes the number of search results that are included in multiple storylines; and also minimizes the number of storylines. Then the invention reports the storylines to the user.

24 Claims, 11 Drawing Sheets

OTHER PUBLICATIONS

S. C. Deerwester, S. T. Dumais, T. K. Landauer, G. W. Furnas, and R. A. Harshman. Indexing by Latent Semantic Analysis. Journal of the American Society for Information Science, 41(6):391-407, 1990.

R. Kannan, S. Vempala, and A. Vetta. On Clusterings: Good, Bad, and Spectal. In Proceedings of the 41st Symposium on Foundations of Computer Science, pp. 367-377, 2000.

J. M. Kleinberg. Authoritative Sources in a Hyperlinked Environment. Journal of the ACM, 46(5):604-632, 1999.

R. Kumar, P. Raghavan, S. Rajagopalan, and A. Tomkins. Trawling the Web for Emerging Cyber-Communities. WWW8/Computer Networks, 31(11-16):481-493,1999.

P. Tsaparas. Link Analysis Ranking Algorithms. PhD thesis, University of Toronto, 2003.

O. Zamir and O. Etzioni. A Dynamic Clustering Interface to Web Search Results. WWW8/Computer Networks, 31(11-16):1361-1374, 1999.

O. Zamir, O. Etzioni, O. Madani, and R. M. Karp. Fast and Intuitive Clustering of Web Documents. In Proceedings of the 3rd International Conference on Knowledge Discovery and Data Mining, pp. 287-290, 1997.

R. Kumar, U. Mahadevan, and D. Sivakumar. A Second Opinion on Search. ACM, May 17-22, 2004, New York.

A Networked World. At Play on a Connected Planet. http://keynet.blogs.com/networks/metadata/ Jan. 21, 2004.

http://regionsofmind.blogspot.com/2002_09_01_regionsofmind_archive.html. Sep. 23, 2010.

http://slashdot.org/articles/00/08/12/1439235_F.shtml. Sep. 24, 2010.

http://www.professorbainbridge.com/professorbainbridgecom/weblogs. Sep. 23, 2010.

http://www.boingboing.net/2003_07_01_archive.html. Sep. 24, 2010.

http://swg.stratics.com/content/news/archive/arc5-2003.txt. Sep. 24, 2010.

http://swg.stratics.com/content/news/archive/arc5-2003.php. Sep. 23, 2010.

http://replay.waybackmachine.org/20040620104455/http://wits2020.net/archives/2003_07.html. Sep. 24, 2010.

http://replay.waybackmachine.org/20040221204337/http://wits2020.net/archives/cat_news.hrml. Sep. 24, 2010.

http://www.twinpeaks.org/archives/creative/PowerStar-90.txt. Sep. 23, 2010.

* cited by examiner

| Query | indira gandhi |
|---|---|
| | terms = death shastri emergency prime feroze minister political congress |
| 1 | http://www.sscnet.ucla.edu/southasia/History/Independent/Indira.html |
| 4 | http://www.kings.edu/womens_history/igandhi-html |
| 7 | http://www.cncw.com/india/indira.htm |
| 14 | http://en.wikipedia.org/wiki/Indira_Gandhi |
| 18 | http://www.galegroup.com/free_resources/whm/bio/ghandi_i.htm |
| 21 | http://www.indiaparenting.com/stories/greatindians/gi010.shtml |
| 44 | http://www.nationmaster.com/encyclopedia/Indira-Gandhi |
| 46 | http://www.theglassceiling.com/biographies/bio12.htm |
| | terms = development research institute |
| 2 | http://www.igidr.ac.in |
| 22 | http://www.80s.com/Icons/Bios/indira_gandhi.html |
| 34 | http://netec.mcc.ac.uk/BibEc/data/fthindgan.html |
| | terms = international delhi airport |
| 5 | http://delhiairport.com |
| 36 | http://www.airport-hotels-worldwide.com/india-hotels/indira-gandhi-intl-hotels-1.htm |
| 47 | http://www.flughafenfuehrer.derreisefuehrer.com/airports/del/del.asp |

FIG. 2

Sample storylines for the query 'indira gandhi'.

| Query | atomic clocks |
|---|---|
| | terms = based frequency national atoms standards |
| 12 | http://physics.nist.gov/GenInt/Time/atomic.html |
| 19 | http://whyfiles.org/078time/2.html |
| 23 | http://www.beyonddiscovery.og/content/view.txt.asp?a=458 |
| 38 | http://www.physlink.com/Education/AskExperts/ae297.cfm |
| 42 | http://www.space.com/scienceastronomy/planetearth/milennium_time_991228.html |
| | terms = indoor barometers weather oregon price |
| 24 | http://www.weatherconnect.com |
| 34 | http://weatherconnection.com/keepingtime.asp?page=3 |
| 35 | http://weatherconnection.com/keepingtime.asp?page=2 |
| 45 | http://www.weathershop.com/orsci_wireless4caster_bar888.htm |
| 47 | http://www.partshelf.com |

Sample storylines for the query 'atomic clocks'.

*FIG. 3*

| Query | abortion |
|---|---|
| | terms = american decision public debate national america |
| 5 | http://www.religioustolerance.org/abo_pbs.htm |
| 15 | http://www.nrlc.org/abortion/pba |
| 19 | http://ethics.sandiego.edu/Applied.Abortion |
| 21 | http://www.theatlantic.com/politics/abortion/abortion.htm |
| 22 | http://www.theatlantic.com/issues/95sep/abortion/abortion.htm |
| 30 | http://www.cbctrust.com/abortion.html |
| 33 | http://www.publicagenda.org/issues/frontdoor.cfm?issue_type=abortion |
| 47 | http://www.elca.org/dcs/abortion.html |
| | terms = human child fetus woman |
| 22 | http://www.theatlantic.com/issues/95sep/abortion/abortion.htm |
| 26 | http://www.elroy.net/ehr/abortion.html |
| 32 | http://afterabortion.blogspot.com |
| 38 | http://www.newadvent.org/cathen/01046b.htm |
| 46 | http://www.christiananswers.net/life |
| 49 | http://catholicl.com/library/Abortion.asp |

Sample storylines for the query 'abortion'.

FIG. 4

| Query | chennai |
|---|---|
| | terms = events news |
| 1 | http://www.chennaionline.com |
| 2 | http://www.chennaionline.com/entertainment |
| 13 | http://www.tie-chennai.org |
| | terms = information road nadu |
| 15 | http://www.imsc.ernet.in/Madras/madras-guide.html |
| 42 | http://www.tamilnadutourism.org/madras.htm |
| 40 | http://www.mapsofindia.com/maps/tamilnadu/chennai-map.htm |
| | terms = permission details |
| 33 | http://www.chennaicorporation.com |
| 48 | http://www.cmdachennai.com |

Sample storylines for the query 'chennai'.

*FIG. 5*

| Query | earthquakes |
|---|---|
| | terms = special lines minutes |
| 1 | http://quake.wr.usgs.gov/recenteqs |
| 15 | http://www.scecdc.scec.org/recenteqs |
| 16 | http://www.scecdc.scdc.org/recenteqs/Maps/Los_Angeles.html |
| 24 | http://www.geophys.washington.edu/recenteqs |
| 35 | http://folkworm.ceri.memphis.edu/recenteqs |
| | terms = cause plate past deep |
| 7 | http://www.seismo.unr.edu/ftp/pub/louie/class/100/plate-tectonics.html |
| 17 | http://www.germantown.k12.il.us/html/earthquakes.html |
| 39 | http://www.ktca.org/newtons/12/earthquk.html |
| 46 | http://www.uh.edu/~jbutler/physical/chapter18.html |

Sample storylines for the query 'earthquakes'.

FIG. 6

| Query | airplane |
|---|---|
| | terms = movie leslie robert |
| 6 | http://www.amazon.com/exec/obidos/tg/detail/-/6300213986?v=glance |
| 20 | http://www.tigersweat.com/movies.airplane |
| 21 | http://www.cs.tufts.edu/~rkogan/humor/airplane.html |
| | terms = instructions paper |
| 4 | http://www.zurqui.co.cr/crinfocus/paper/air-bld1.html |
| 36 | http://www.josephpalmer.com/planes/Airplane.shtml |

Sample storylines for the query 'airplane'.

*FIG. 7*

| Query | tree sap car |
|---|---|
| | terms = remove original forums archive thread |
| 11 | http://forums.nasioc.com/forums/showthread/t-435150.html |
| 17 | http://forums.evolutionm.net/showthread/t-36029.html |
| 23 | http://forums.beyond.ca/showthread/t-21728.html |
| 27 | http://www.honda-acura.net/showthread/t-82031.html |
| 34 | http://www.clubcivic.com/showthread/t-3162.html |
| | terms = protect elements auto |
| 9 | http://www.extension.umn.edu/projects/yardandgarden/ygbriefs/h454removesap.html |
| 14 | http://222.likenu-detail.com/services.htm |
| 30 | http://www.allarounddetailing.com/267265.html |
| 38 | http://www1.excite.com/home/info/learn2/learnlets_qa_overview/0,14917,auto_253_0_00.html |
| 40 | http://www.mikeogara.net/improve_your_car/car_covers |
| 46 | http://www.autopainting.com/CarCare.htm |
| 49 | http://auto.valuecatalogs.com/Covers_and_Carports/Car_Covers/more3.html |

Sample storylines for the query 'tree sap car'.

FIG. 8

| Query | jon kleinberg |
|---|---|
| | terms = sloan young visiting |
| 13 | http://www.webuse.umd.edu/abstracts2002/abstract_2002_kleinberg.htm |
| 25 | http://www.cs.wisc.edu/~lists/archive/graduates/msg00700.html |
| 48 | http://www.eecs.berkeley.edu/Colloquims/Archives/01-02/kleinbergap.html |

Sample storylines for the query 'jon kleinberg'.

FIG. 9

Term, Term, Term
Website, Website, Website
Website, Website, Website
Website, Website, Website Advertisement Advertisement

Term, Term, Term
Website, Website, Website, Website, Website, Website
Website, Website, Website, Website, Website, Website

Term, Term, Term
Website, Website, Website
Website, Website, Website
Website, Website, Website

Term, Term, Term
Website, Website, Website
Website, Website, Website
Website, Website, Website

Term, Term, Term
Website, Website, Website
Website, Website, Website
Website, Website, Website

Term, Term, Term
Website, Website, Website
Website, Website, Website
Website, Website, Website

Term
Term
Term

Website, Website,
Website, Website,
Website, Website,
Website, Website,
Website, Website,
Website, Website Advertisement

*FIG. 10*

COMPUTER SYSTEM FOR IDENTIFYING STORYLINES THAT EMERGE FROM HIGHLY RANKED WEB SEARCH RESULTS

BACKGROUND OF THE INVENTION

1. Field of the Invention

The present invention provides a method of searching for locations (e.g., websites) on a computer network (e.g., the internet). However, rather than directly reporting the search results to the user as conventional search methodologies do, the invention reorganizes the search results into storylines.

2. Description of the Related Art

As the richness of content on the web grows, so does the social and economic significance of the web. Web searches are increasingly becoming the default starting point for consumer product purchases, term papers, vacation plans, curiosity-driven exploration of topics, etc. The role of the search engine as an entry point to the millions of interesting slices of the web is therefore more sharply accentuated. A question that naturally arises is how best to utilize a browser's screen in summarizing the thousands of web pages that mention the handful of terms a user types into a search engine.

The first generation of search engines, beginning with AltaVista up to the currently most popular Google, have taken the viewpoint of ranking the search results in a linear order, and presenting the top ten or so results on the first page, with pointers to the next ten, and so on. This straightforward approach has served us remarkably well, and it is a fair guess that are more than half of all user queries are adequately handled by the top page in the search results. There are two main reasons for this: first, a good search engine is often capable of promoting to the top spot the best page relevant to the query, and secondly, most queries tend to have many highly relevant pages on the web, so just about any of them would serve well as the top result.

An interesting phenomenon occurs when one studies the top 100 pages for a query. Search engines routinely optimize the result set primarily for the top 10 positions; the pages listed in positions 11-100 (for example) share many interesting characteristics. For example, these pages may be viewed as good reflections of the quality of the "web presence" of the topic, as discovered by a good but mechanical ranking algorithm. Secondly, these results are usually relevant to the query, often contain valuable pieces of information, but are not necessarily the best pages on the topic. Finally, the relative merits of these pages are not always obvious; for example, for the query "tree sap car" (to find out how to remove tree sap from automobiles), the invention find that the page ranked 11 isn't particularly superior to the one ranked 49. A possible reason for the latter two phenomena is that search engines like Google employ global ranking mechanisms (e.g., PageRank), and the top 100 results are just the most important places on the web where the query terms are mentioned.

SUMMARY OF THE INVENTION

The invention presents a framework to tap the wealth of information hidden beyond the first page of search results. The invention is axiomatically developed and combinatorial in nature. In this framework, the invention develops simple and effective algorithms that discover storylines (windows) that offer glimpses into interesting themes latent in the search results beyond the top 10.

Thus, this disclosure provides a method of and service for searching for locations (e.g., web sites) on a network (e.g., the internet). The method begins by inputting a query from a user and searching the internet based on the query to produce search results (comprising web sites) in an order of relevance, where more relevant results are ordered ahead of less relevant results. However, rather than directly reporting the search results to the user as conventional search methodologies do, the invention reorganizes the search results into storylines. More specifically, the invention identifies focused vocabularies from the search results, where each focused vocabulary forms a separate storyline. In addition, the invention maximizes the number of search results that are included in each storyline, minimizes the number of search results that are included in multiple storylines; and also minimizes the number of storylines. Then the invention reports the storylines to the user.

The inventive process of identifying focused vocabularies comprises evaluating distributions of terms within the search results and grouping results with similar distributions together into the storylines. The invention can minimize the number of storylines by adjusting the level of uniformity of the distributions. This process of evaluating distributions of the terms creates cliques of terms, wherein results that have more than a predetermined percentage of terms of a given clique are grouped together. Similarly, the process of minimizing the number of storylines comprises adjusting the number of cliques produced by the process of evaluating distributions of terms.

The processes of maximizing the number of search results included within each storyline and minimizing the number of storylines are given a higher priority than the uniformity of the focused vocabularies and the process of minimizing the number of search results included within a storyline. The storylines are formed irrespective of the order of relevance (the entire spectrum of search results is used in the storylines) and results are listed in the storylines in the order of their relevance.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which:

FIG. 2 is an example of a storyline created with the invention;

FIG. 3 is an example of a storyline created with the invention;

FIG. 4 is an example of a storyline created with the invention;

FIG. 5 is an example of a storyline created with the invention;

FIG. 6 is an example of a storyline created with the invention;

FIG. 7 is an example of a storyline created with the invention;

FIG. 8 is an example of a storyline created with the invention;

FIG. 9 is an example of a storyline created with the invention;

FIG. 10 is an example of how storylines could be presented to a user; and

DETAILED DESCRIPTION OF PREFERRED EMBODIMENTS OF THE INVENTION

Figure 1:
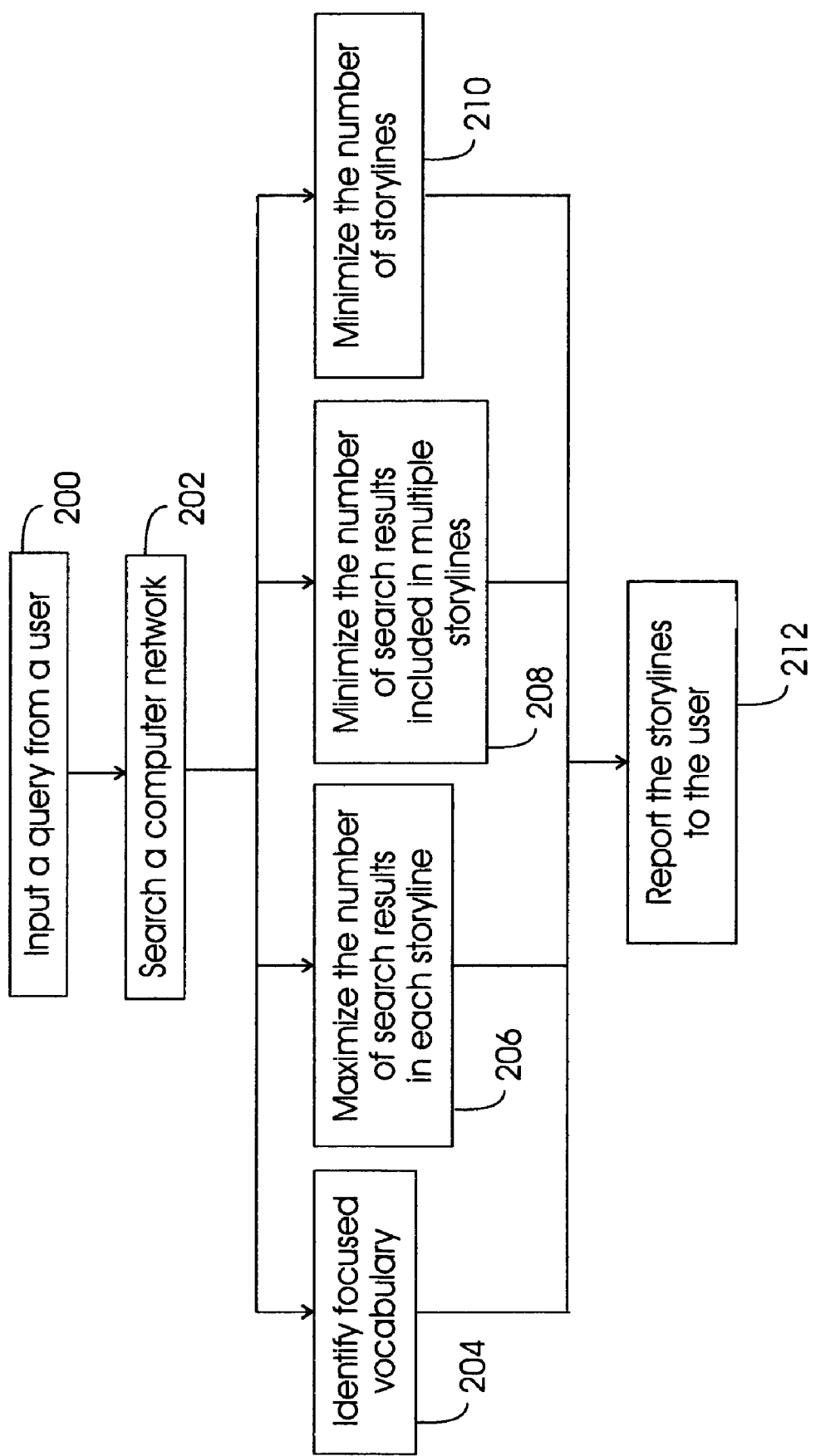
FIG. 1 is a flow diagram illustrating a preferred method of the invention.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As discussed above, documents 11-100 in a typical search result are good sources of valuable pieces of information, usually from reliable websites. The invention answers the following questions. What, if any, are the viewpoints on the query topic latent in these pages? Are they mere restatements of what is contained in the top 10 pages, or are they untapped sources of added value to the user?

As an example, consider the query "Jon Kleinberg" (a speaker). A University of Wisconsin page describing a colloquium talk by Kleinberg is perhaps not the most exciting result for this query, but it is a meaningful snippet of information from a snapshot of the web at some point in time. However, when one notices that the Wisconsin page is one among many announcements of Kleinberg's talks at various places, what emerges is the analogue of what the news media considers "an interesting storyline." The collective weight of evidence offered by a handful of pages in the top 100 suggests that this is an angle from which to summarize the web presence of the topic Jon Kleinberg.

The analogy with a newspaper storyline is compelling. The collection of search results for a particular query may be thought of as the collection of facts, chronicles, thoughts and ideas that abound following a major news event. For example, after the Superbowl, newspapers identify several storylines: the main news story about the championship game, one about outstanding contributions by key players, stories of unlikely heroes, the latest collection of Superbowl television commercials, key revenges/comebacks, etc. Newspapers have mastered the art of presenting these stories, arranging them on the (sports) front page to pique the readers' interest, and directing them to the inner pages that contain most of the content.

In this disclosure, we study the problem of how to robustly formulate what constitutes a good storyline within search results; the invention also address the question of how to mine the top 100 (or so) results to uncover the various angles from which the results may be summarized.

The starting point of the invention is the observation that, much as in newspaper storylines, each storyline lurking within search results has its unique vocabulary. In the example "Jon Kleinberg" mentioned above, it is not hard to notice that most announcements of Kleinberg's talks share the words "abstract," "distinguished," "seminar," "sloan," "investigator," "almaden," etc. This type of vocabulary is indeed rather unique to University talk announcements, where a fairly standard template is used (containing words like abstract, seminar, etc.), and a brief biographical sketch of the speaker is included (hence the words Sloan and investigator). These words are also quite uncommon among the other top 50 pages for this query. Thus, this rather small set of words serves as a signature that unifies a collection of pages thematically.

This example also highlights three important facts. The first fact is that approaches such as latent semantic indexing [7], which are extremely effective at classifying large collections of documents on a broad topic, are unlikely to identify small focused collections that are typical in a storyline. This is because of the fact that LSI and other schemes based on vector space models employ a global notion of similarity. If the talks given by Kleinberg at various places have different content, the terms that occur in the talk abstracts will significantly influence the pair wise similarity of these documents, and they will be deemed dissimilar for the purposes of classification.

The second noteworthy observation is that, in contrast to global schemes like LSI [7], more focused and combinatorial approaches that explicitly scour the results for "signature structures" (such as a small set of terms that uniquely characterize a collection of documents) are likely better suited for the task of finding hidden storylines. This is an interesting twist in the development of ideas relevant to information organization and retrieval. Kleinberg's HITS algorithm and its successors [9, 5] may be thought of as applying LSI-like concepts to link analysis on the web; these ideas have had tremendous influence on web search technologies. The invention's use of signature structures as the one outlined above may be viewed as an application of ideas from link analysis (specifically the work of Kumar et al. [10]) within the domain of text analysis.

Finally, the example above raises an intriguing question about how to present a storyline discovered from the search results. Several search engines suggest various possible "query refinements," in terms of additional terms to be included to the query terms, and allow the user to choose one of them. The inventors feel that it is not a good idea to offer the query refinement viewpoint to the user when summarizing an interesting collection of documents. It is probably somewhat puzzling to a typical web user to be shown terms like the "abstract" and "sloan" as possible ways to refine the query "Jon Kleinberg." Rather, a simple list of (titles of) pages that are considered to be a group (possibly listed to appear as articles in a newspaper) might serve as a better way to indicate to the user what the collection is about. To do this, however, it is very important to have robust algorithms to discover the collection, so that the titles of the web pages automatically convey to the user how these pages are related.

The idea of mining the top 50 or 100 results may also be viewed as a method to rerank the best documents for a given query. Currently, several heuristics exist (homepage detection, hub/faq identification, etc.) that are aimed at improving the quality of the top few results. The invention mines the characteristics and structure in the top 100 pages as a reranking mechanism that will produce a more complete summary of the slice of the web pertaining to the query topic.

This disclosure first outlines a formulation of the problem of reorganizing search results with the intent of highlighting the important storylines. To do this, this disclosure develops a semi-axiomatic approach, where this disclosure lists certain desiderata that the invention would like to satisfy. The compilation of the desiderata is motivated by fairly natural requirements, and the goal of establishing these is to cast the mining problem as a combinatorial optimization problem.

Roughly speaking, the invention identifies a problem on a weighted version of the term-document bipartite graph, where the documents need to be covered by large subsets of terms. Conversely, the invention requires that given one of the subsets of the terms in the cover, they more or less accurately pinpoint the documents that they cover.

In terms of algorithms, the invention presents a family of heuristics based on discovering large bipartite cliques in the term-document relation, similar to the discovery of "cyber communities" in [10]. In our setting, the clique problem is somewhat more general; to identify large bipartite cliques, the invention adopts a randomized greedy strategy. The invention also points out several ways to enhance the accuracy/speed of these heuristics. These include a finer filtering of the term-document relation depending on the query terms, incorporating information retrieval techniques such as tf-idf, etc. Finally, this disclosure presents a number of experimental results highlighting the hidden storylines uncovered by the invention, and based on these, presents some thoughts about how best to integrate the storylines discovered with the rank-ordering produced by the search engine.

With respect to link analysis, the first body of related work is in the area of search algorithms that try to exploit hyperlink information. Link analysis algorithms in the context of web search, starting with the HITS algorithm [9] and its subsequent enhancements [1, 5], and the PageRank algorithm [2], have been the hallmark of many commercially successful search engines. (For a detailed account of link analysis in web search algorithms, see the thesis of Tsaparas [11].) The Google search engine (www.google.com) is based on the PageRank algorithm and ideas behind the Teoma search engine (www.teoma.com) are inspired by the HITS algorithm.

With respect to clustering web search results, one of the early works on clustering web search results was done by Zamir and Etzioni [12] (see also [13]); their technique was to extract phrases from the search result snippets and to identify phrases that are common to groups of documents. The concepts of result set clustering and post-retrieval document clustering have been studied in the information retrieval community (see, for instance, [6]); traditionally, they have been used to cluster documents in the result set based on the degree of relevance, to filter out irrelevant documents, and to support context-based relevance feedback. Clustering result sets has also been studied in the information visualization community where the goal is to present the search results to the user in the best possible way. Latent semantic indexing LSI [7] and other spectral methods (e.g., [8]) are popular techniques to cluster especially large collection of documents. The invention differs fundamentally from the body of work on clustering, since the invention attempts to explain as many of the documents as possible in terms of the more unified viewpoint of storylines.

Commercial and experimental search engines have been interested in the problem of clustering web search results. The now-defunct Manjara and its current improved incarnation called EigenCluster (www-math.mit.edu/cluster) provide a clustering of search engine results; the implementation is based on a spectral clustering algorithm [8]. Vivisimo (vivisimo.com) offers a document clustering product that is an overlay to a search engine and can organize search results on the fly. Teoma (teoma.com) organizes search results into communities and presents them to the user; the user has the option of refining his/her search using the keywords presented for each community. Google has a clustering agent called Google Sets (labs.google.com/sets) and Wisenet (wisenut.com), AlltheWeb (www.alltheweb.com), and many other search engines offer clustering information on top of search results. For a comprehensive account of clustering search engine results, see the article by Calishain [4].

As mentioned earlier, the invention is somewhat related to trawling [10]. Trawling is a process to automatically enumerate communities from a crawl of the web, where a community is defined to be a dense bipartite subgraph. One way to trawl the web is to look for bipartite cliques. An algorithm to accomplish this enumeration was described in [10]. The invention cannot use the trawling algorithm per se since the inventive notion of cliques is more general, the invention deals with weighted bipartite graphs and the degree characteristics of the underlying graph make it hard to apply the combinatorial algorithm of [10] to the invention.

The storylines uncovered by the invention lead to the following combinatorial reranking question. Suppose there is a linear ordering of elements of a universe and the goal is to rank given subsets of the universe, where the ranking should satisfy some basic axioms. In this setting, the universe corresponds to the top 100 results, the subsets correspond to the collections of webpages found by the invention, and the question is how to re-rank the clusters, taking into account the ranking of the web pages themselves. This problem has been considered before and [3] shows that under reasonable axioms, ranking functions do not exist for this problem.

In this section, this disclosure describes the search result reorganization problem. Let Q denote a query (a set of terms). Let D denote the set of documents returned by the search engine for the query Q. For a document d, let T(d) denote the multiset of terms in d, and let T denote the union, over all $d \in D$, of the sets T(d). Similarly, for a term t, let D(t) denote the set of all documents that contain the term t. Let G=(D,T,E) denote the weighted bipartite graph, where the left hand side consists of one node per document and the right hand side consists of one node per term, and the edge function E: $D \times T \to \Re$ gives, for a document d and a term t, the number of occurrences of t in d.

One way to present the invention is to consider probability distributions on the set D of documents. (A function p: $D \to [0, 1]$ is a probability distribution on D if $\Sigma_{d \in D} p(d)=1$.) Let U denote the uniform distribution D, that is, U(d)=1/|D| for each $d \in D$. For a term $t \in T$, let $\mu_t$ denote the distribution on D defined as follows. Let $\mu_t(d)=0$ if E(d,t)=0, and $\mu_t(d)=1/|D(t)|$ if E(d,t)>0; that is, $\mu_t$ is the distribution on D induced by picking a document d uniformly from among all documents that contain t. Let $\mu$ denote the distribution on D induced by picking a term t uniformly at random from T, and then picking a document according to $\mu_t$. (One may also define $\mu_t$ by taking into account the frequency with which t occurs in d; namely, by $$\mu_t(d) = \frac{E(d, t)}{\sum_{d \in D} E(d, t)},$$

that is, $\mu_t$ is the distribution on D induced by picking a document d with probability proportional to the number of occurrences of t in d. This leads to a slightly more general form of the framework.)

One central notion in the invention is that of a focused vocabulary, which is a collection C of terms such that the distributions $\mu_t$, for $t \in C$, all look very similar. Recall that each of the $\mu_t$'s is uniform among a subset of the documents. When several $\mu_t$'s are very similar to each other (under some measure of similarity of distributions), the invention has a set of terms that almost uniquely characterize a subset of the documents. For example, for the query "Indira Gandhi," the terms "jawaharlal," "assassination," "sterilization," "Bahadur" appears together in almost all, and only in, pages that contain her biography. Thus, if we knew that a document d from the result set contains all these terms, we can immediately conclude that it is one of the biographical pages, as opposed to the numerous other top 50 (and top 10) pages about the various institutions named after her. In fact, if we simply looked at the documents in D that contain the term "sterilization," they all turn out to be biographical pages of Indira Gandhi; however, to robustly characterize a group of pages as thematically unified, and to do it with a degree of confidence, it helps to find a collection C of terms all of which pick essentially the same set of 10 or so documents from the top 50 results. This also underscores our earlier observation that the set of documents that form a storyline tends to share a vocabulary that sets it apart from the rest of the documents.

Building on the notion of a focused vocabulary, this disclosure now presents the combinatorial formulation of the reorganization problem. With the notations set above (Q, D, T, etc.), the goal is to find a sequence of sets of terms $C_1$, $C_2, \ldots, C_k$, such that the following properties are satisfied:

(1) (each $C_i$ is a focused vocabulary) for each set $C_i$, for every pair $t \neq s, t, s \in C_i$, the distributions $\mu_t$ and $\mu_s$ are close in $L_1$ distance to within some tolerance parameter $\in$;

(1') a consequence of (1) is that the distribution $\mu_{C_i}$, defined by picking a term $t \in C_i$ uniformly and picking a document according to $\mu_t$, is nearly uniform on some subset $D(C_i)$ of the documents;

(2) (every document is captured by some storyline) for every $d \in D$, there is at least one i such that $d \in D(C_i)$;

(3) (no document belongs to multiple storylines) for every $d \in D$, for every $i \neq j$, $d \notin D(C_i) \cap D(C_j)$;

(4) the number k of different storylines is minimized.

Note that (3) is a fairly strong requirement, but is intuitively helped by (4), which is a requirement that conflicts with (1) and (2). If the invention identifies, for each document d a unique term that occurs only in d, the invention would definitely satisfy (1)-(3), but (4) would be violated. If the invention finds a small set of terms that cover all the documents (e.g., using all popular terms), and let each $C_i$ be a singleton consisting of exactly one of these terms, the invention would easily satisfy (1), (2) and (4), but (3) would be severely compromised. The trivial solution where the entire set of terms is reported as $C_1$ satisfies (2), (3), and (4) (in fact, with k=1) but (1) is most likely to be seriously violated. Finally, not satisfying (2) while satisfying (1), (3), and (4) does seem reasonable, but as the drawback that the invention would then not find more than one storyline. Another way to reformulate (2) is to require that the number of uncovered documents be minimized.

This aspect of the invention is shown in flowchart format in FIG. 1. More specifically, the method begins by inputting a query from a user 200 and searching a computer network 202 (e.g., the internet) based on the query to produce search results (e.g., web sites) in an order of relevance, where more relevant results are ordered ahead of less relevant results. However, rather than directly reporting the search results to the user as conventional search methodologies do, the invention reorganizes the search results into storylines 204-210. More specifically, the invention identifies focused vocabularies 204 from the search results, where each focused vocabulary forms a separate storyline. In addition, the invention maximizes the number of search results that are included in each storyline 206, minimizes the number of search results that are included in multiple storylines 208; and also minimizes the number of storylines 210. Then the invention reports the storylines to the user 212.

The inventive process of identifying focused vocabularies 204 comprises evaluating distributions of terms within the search results and grouping results with similar distributions (similar vocabularies) together into the storylines. The invention can minimize the number of storylines by adjusting the level of uniformity of the distributions. This process of evaluating distributions of the terms creates cliques of terms, wherein results that have more than a predetermined percentage of terms of a given clique are grouped together. Similarly, the process of minimizing the number of storylines comprises adjusting the number of cliques produced by the process of evaluating distributions of terms. The storylines are formed irrespective of their order of relevance (the entire spectrum of search results is used in the storylines) and results are listed in the storylines in the order of their relevance.

In summary, these four criteria lead to a formulation where each one of them is natural and important, and these criteria collectively express what is intuitively meant by asking to uncover as many latent storylines as possible from a set of search results. The delicate balance of the four criteria outlined above suggests that it is not simply a matter of dropping one of the four criteria. Therefore, the invention takes an approach where the invention weakens requirements (1) and (3) in a systematic manner. Thus, the processes of maximizing the number of search results included within each storyline 206 and minimizing the number of storylines 210 are given a higher priority than: the uniformity of the focused vocabularies 204 and the process of minimizing the number of search results included within a storyline 208. The idea is to run an algorithm that finds a large bipartite clique in the graph G of documents and terms. A bipartite clique is a complete bipartite graph between two subsets of nodes, namely, a subset $U \subseteq D, V \subseteq T$, such that for every $d \in U$ and $t \in V$, $(u,v)$ is an edge of non-zero weight. Hopefully, this would produce a feasible vocabulary, and hence the main storyline latent among the search results. Once the invention finds a large clique, the invention removes all the covered documents, as well as the edges from the terms in the clique from all other documents. The invention now repeats the process, looking for another large clique, and continues this until the cliques are too small to be interesting. Of course, after each clique is found, the invention conducts a quick local search around the clique and collects all documents that contain at least (say) 75% of the terms in the clique. This gives a dense bipartite graph, which, in the sequel, the invention will also refer to as a clique by abuse of terminology.

The main drawback here is that groups of terms that are present in earlier cliques would tend to violate (1) (since they might also inadvertently cover documents not in the clique containing them), and similarly, documents that are covered in later stages might be multiply covered by the earlier cliques, violating (3). The challenge is to somehow control these violations so that the resulting storylines that are identified are still interesting and different from each other. One heuristic that the invention employs here is to filter the cliques produced in successive iterations carefully based on how "fresh" the viewpoints from the underlying pages are. For each clique with m terms and n documents produced by the algorithm, the invention assign as score, which counts how many of the m terms in the clique appear in more than $n(1+)$ documents overall, for some $\alpha \in (0,1)$, say $\alpha = \frac{1}{2}$. For some $\beta \in (0,1)$, say $\beta = \frac{1}{4}$, if more than m terms appear in more than $n(1+\alpha)$ documents, the invention declares that the clique is essentially nothing new, and discards it.

Thus, the invention discovers as many cliques as possible, where each clique remains quite sharply focused on the documents contained in it. When no more cliques of large enough size (say 3 or more) could be found, the invention terminates the algorithm.

The inventors have identified several enhancements to this basic algorithm that result in faster running time and/or better quality storylines. (1) Avoiding overly popular terms (e.g., terms that appear in more than one-third of all documents in the result list) appears to help in many ways. First of all, it reduces the search space when attempting to find cliques; secondly, it offers a natural way to words that are very common and relevant to the query topic. This is similar to the use of the tf·idf quantity in information retrieval. (2) Similarly, eliminating all stopwords, common words in English, etc., offers considerable speed up and robustness to the clique-finding process. (3) Another heuristic that is very useful in keeping the data size manageable is to define the edge relation between documents and terms somewhat differently. Rather than include every term in a document in the graph, the invention limits itself to those terms that appear in the vicinity of one of the query terms inside the document. Vicinity here is typically defined by a window of fixed size (e.g., 30 words) around each occurrence of every query term within the document.

One of the effects of the invention is the fact that the resulting document-term graph is kept rather sparse, with an average of about 20-30 terms per document. This implies that the scheme is fairly practical. Note that about 20-30 terms per document is roughly the same amount of data that search engines routinely serve as "snippets" along with each search result (highlighting where in the document the query terms appear). The clique partition algorithm may even be run as a client side computation, upon request by the user.

This disclosure now presents some highlights of the storylines uncovered by the invention for various queries. To avoid clutter, this disclosure will not enumerate all possible settings of the various internal parameters of the algorithm; rather this disclosure reports results based on settings that work uniformly well across a wide range of query types. For each of the sample queries described below is the context of the query, is to aid the reader. All results were obtained by mining the top 50 results for the queries on Google; the actual rank of each page present in the table is given along with the URL. (1) The first query is 'indira gandhi', who was a popular Indian prime minister. In FIG. 2, the first storyline concerns her biography, as identified by the terms like 'death', 'feroze' (her spouse), 'congress' (her political party). The second storyline concerns a research institute named after her and the third storyline is about the international airport in New Delhi that bears her name. (2) The next query is 'atomic clocks'. FIG. 3 shows two storylines, the first is about the physics, operation, and standards of such clocks, and the second consists of vendors of weather-related products. (3) The next query is 'abortion', and FIG. 4 shows two storylines. The first is about public debates and discussion that are still taking place in this country—the terms 'debate', 'national', 'america', etc. The second is the more conservative collection of opinions on abortion, the terms 'human', 'fetus', 'child' are illustrative clues. (4) The next query is 'chennai', a city in South India. FIG. 5 shows three interesting storylines. The first deals with what is happening in the city—terms like 'news', 'events' identify this. The second concerns information about the city—relevant terms are 'information', 'roads', etc. The third is about construction in the city—the two websites are related to the city corporation and metropolitan development authority. (5) The next query is 'earthquakes', and two storylines are presented in FIG. 6. The first storyline is about recent earthquakes ('minutes') and the second is about the geology of earthquakes ('plate', 'deep') and what cause them ('cause'). (6) The next query is 'airplane', and FIG. 7 shows two non-obvious storylines. The first is about the slapstick spoof movie starring Leslie Nielsen and the second is about making ('instructions') paper airplanes ('paper'). (7) The next query is 'tree sap car', for which FIG. 8 shows two storylines. The first is a bunch of discussion for a about removing car sap ('forums', 'archive', 'thread'), and the second is vendors of products that protect automobile exterior ('protect', 'elements'), there are many car cover manufacturers listed in this storyline. (8) The query for the final example shown in FIG. 9 is 'Jon Kleinberg', for which the invention shows a unique storyline. This storyline is about a number of talks he gave at Universities—the terms 'sloan', 'young' are terms used in writing his biography attached to the talk abstract.

The storylines can be presented to the user in many different ways. For example, the storylines can be presented as shown in FIGS. 2-9. Alternatively, the storylines can be presented in "newspaper" form, as shown in FIG. 10. In such a format, the most common or most important terms in the focused vocabulary are presented as the headline of a newspaper article. In FIG. 10 these 'headline' terms are shown in larger font using the phrase "term, term, term." Below each "headline" appear the search results that were grouped within the storyline. In FIG. 10, these grouped results are shown using the term "website". The search results can be presented below the headline in the order according to a different order based on, for example, the number or frequency of focused vocabulary terms contained within the search result (website). In addition, the naturally occurring order can be altered by paid placement, etc. Not all search results within each storyline need to be listed, but instead just the top 5 or 10 can be listed to avoid overly cluttering the display to the user. As also shown in FIG. 10, advertisements can be strategically placed within the storylines. Different fonts and/or colors can also be used to distinguish the different storylines. In one example, the storylines that most closely match the original query can be presented in larger fonts or brighter colors when compared to less relevant storylines. For example, a storyline focused on vocabulary that contains more query search terms than other focused vocabularies could be considered to more closely match the original query and be more relevant to the original query.

Note that for each of the queries, the storylines this disclosure chose to present are not the only ones uncovered by the algorithm; rather, they were chosen to convey storylines with strikingly different viewpoints from the generic top 10 page for the queries. Secondly, note that almost all of these collections of pages are not identified as a theme by either Teoma or Vivisimo, two of the popular clustering-based search engines. This disclosure makes several observations about the results the invention obtains. (1) In many cases, cliques, even though they might be quite small, turn out to be very useful and distinctive. For example, see the third storyline in FIG. 5 and the second storyline in FIG. 7. (2) If the invention examines a given storyline, the ranks of the pages present in the storyline span the entire spectrum 1-50 of the results (for instance, the first storyline in FIG. 2). Most often, it is the case that for many of the pages in a storyline, the rank is much more than 10. In some storylines, even the best rank is quite poor, for instance, the second storyline in FIG. 4. (3) By giving a chance to pages ranked well below the top 10, the invention addresses the "tyranny of the majority." In other words, the invention gives a chance for the minority viewpoints on the query to be reflected adequately in the first page of search results, for example, the storyline in FIG. 9. (4) The algorithm can uncover interesting communities especially when it is not obvious such communities exist. For example, consider the storyline concerning a discussion group in FIG. 8. By becoming aware of the existence of several different discussion groups, the user searching for information about removing tree sap from cars can directly post her/his query and benefit directly. In this case, note also that all the ranks are beyond 10.

Figure 11:
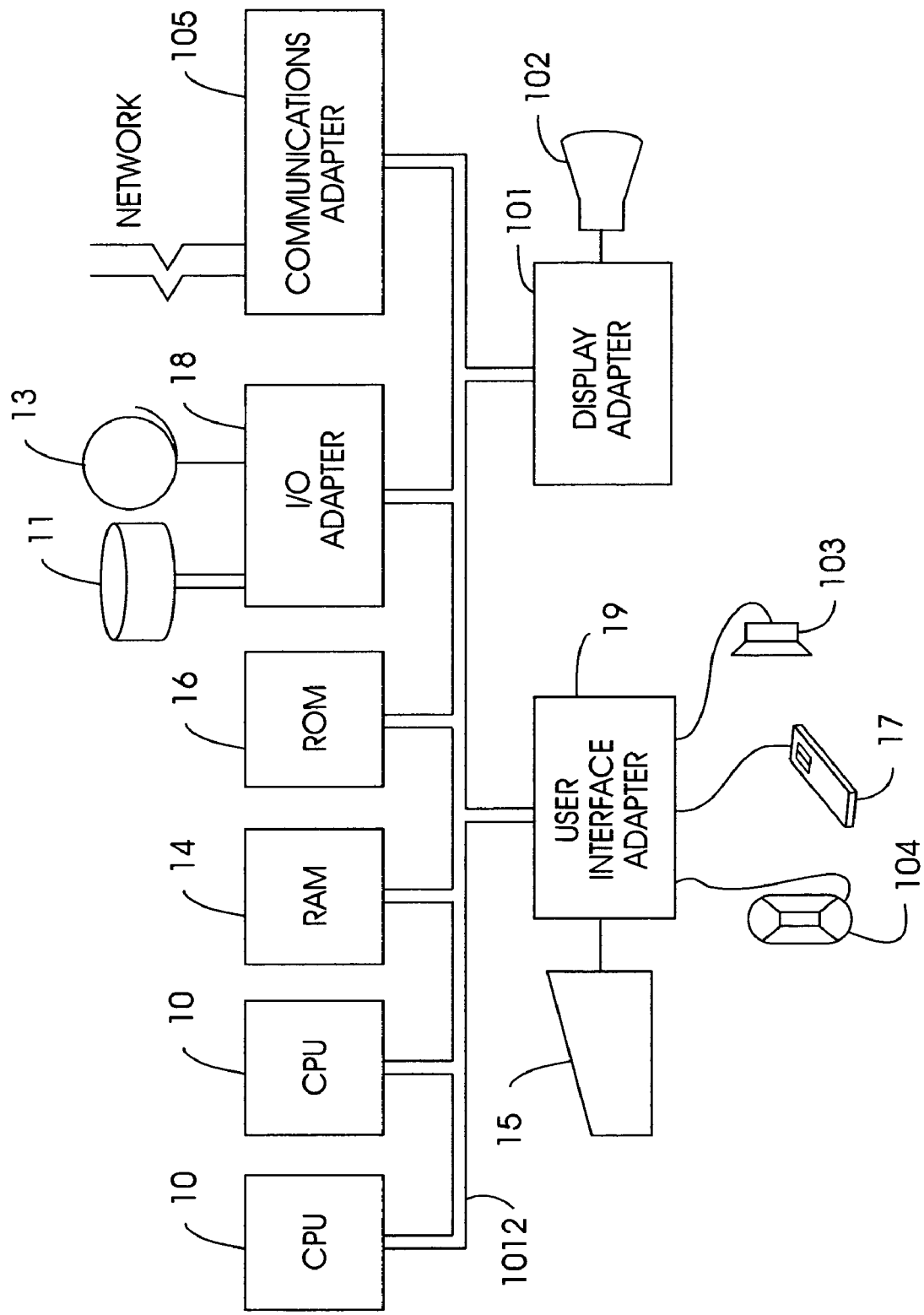
FIG. 11 is a schematic diagram of a hardware system upon which the invention can operate.

A representative hardware environment for practicing the present invention is depicted in FIG. 11, which illustrates a typical hardware configuration of an information handling/computer system in accordance with the subject invention, having at least one processor or central processing unit (CPU) 10. CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as touch screen device (not shown) to bus 12, communication adapter 105 for connecting the information handling system to a data processing network, and display adapter 101 for connecting bus 12 to display device 102. A program storage device readable by the disk or tape units, is used to load the instructions which operate the invention also loaded onto the computer system.

This disclosure presents a framework to data-mine web search results with the aim of uncovering storylines that may be buried in the highly-ranked pages. The invention leads to a family of simple and natural algorithms based on detecting dense bipartite subgraphs in the term-document relation. Experimental evidence suggests that there is much value to be attained by mining the search results beyond the first screenful.

While the invention has been described in terms of preferred embodiments, those skilled in the art will recognize that the invention can be practiced with modification within the spirit and scope of the appended claims.

What is claimed is:

1. A method of searching locations on a computer network using a computer, said method comprising:
    searching, using said computer, said network based on a query to produce search results; and
    reorganizing, using said computer, said search results into storylines by:
        identifying, using said computer, focused vocabularies from said search results, wherein each focused vocabulary forms a separate storyline;
        maximizing, using said computer, the number of search results that are included in each storyline;
        minimizing, using said computer, the number of search results that are included in multiple storylines; and
        minimizing, using said computer, the number of storylines,
    wherein said process of identifying focused vocabularies comprises evaluating distributions of terms within said search results and grouping search results with similar distributions together into said storylines,
    wherein said process of evaluating distributions of said terms creates cliques of terms, and
    wherein search results that have more than a predetermined percentage of terms of a given clique are grouped together.

2. The method in claim 1, wherein said process of minimizing the number of storylines comprises adjusting the level of uniformity of said distributions.

3. The method in claim 1, wherein said process of minimizing the number of storylines comprises adjusting the number of cliques produced by said process of evaluating distributions of terms.

4. The method in claim 1, wherein the processes of maximizing the number of search results included within each storyline and minimizing the number of storylines are given a higher priority than: the uniformity of said focused vocabularies and minimizing the number of search results included within a storyline.

5. The method in claim 1, wherein search results are listed in said storylines in the order of relevance of said search results.

6. A method of searching locations on a computer network using a computer, said method comprising:
    searching, using said computer, said network based on a query to produce search results; and
    reorganizing, using said computer, said search results into storylines, by:
        evaluating distributions of terms within said search results;
        grouping search results with similar distributions together into said storylines;
        maximizing, using said computer, the number of search results that are included in each storyline; and
        minimizing, using said computer, the number of storylines,
    wherein said process of evaluating distributions of said terms creates cliques of terms, and
    wherein search results that have more than a predetermined percentage of terms of a given clique are grouped together.

7. The method in claim 6, wherein said process of minimizing the number of storylines comprises adjusting the level of uniformity of said distributions.

8. The method in claim 6, wherein said process of minimizing the number of storylines comprises adjusting the number of cliques produced by said process of evaluating distributions of terms.

9. The method in claim 6, wherein search results are listed in said storylines in the order of relevance of said search results.

10. A method of searching for web sites on the internet using a computer, said method comprising:
    inputting, using said computer, a query from a user;
    searching, using said computer, the internet based on said query to produce search results comprising said web sites in an order of relevance, where more relevant search results are ordered ahead of less relevant search results;
    reorganizing, using said computer, said search results into storylines by:
        identifying, using said computer, focused vocabularies from said search results, wherein each focused vocabulary forms a separate storyline;
        maximizing, using said computer, the number of search results that are included in each storyline;
        minimizing, using said computer, the number of search results that are included in multiple storylines; and
        minimizing, using said computer, the number of storylines; and
    reporting said storylines to said user,
    wherein said process of identifying focused vocabularies comprises evaluating distributions of terms within said search results and grouping search results with similar distributions together into said storylines, wherein said process of evaluating distributions of said terms creates cliques of terms, and wherein search results that have more than a predetermined percentage of terms of a given clique are grouped together.

11. The method in claim 10, wherein said process of minimizing the number of storylines comprises adjusting the level of uniformity of said distributions.

12. The method in claim 10, wherein said process of minimizing the number of storylines comprises adjusting the number of cliques produced by said process of evaluating distributions of terms.

13. The method in claim 10, wherein the processes of maximizing the number of search results included within each storyline and minimizing the number of storylines are given a higher priority than: the uniformity of said focused vocabularies and minimizing the number of search results included within a storyline.

14. The method in claim 10, wherein search results are listed in said storylines in the order of relevance.

15. A program storage device readable by machine, tangibly embodying a program of instructions executable by the machine to perform a method of searching locations on a computer network using a computer, said method comprising:

searching, using said computer, said network based on a query to produce search results; and reorganizing, using said computer, said search results into storylines by:

identifying, using said computer, focused vocabularies from said search results, wherein each focused vocabulary forms a separate storyline;

maximizing, using said computer, the number of search results that are included in each storyline;

minimizing, using said computer, the number of search results that are included in multiple storylines; and minimizing, using said computer, the number of storylines, wherein said process of identifying focused vocabularies comprises evaluating distributions of terms within said search results and grouping search results with similar distributions together into said storylines, wherein said process of evaluating distributions of said terms creates cliques of terms, and wherein search results that have more than a predetermined percentage of terms of a given clique are grouped together.

16. The program storage device in claim 15, wherein said process of minimizing the number of storylines comprises adjusting the level of uniformity of said distributions.

17. The program storage device in claim 15, wherein said process of minimizing the number of storylines comprises adjusting the number of cliques produced by said process of evaluating distributions of terms.

18. The program storage device in claim 15, wherein the processes of maximizing the number of search results included within each storyline and minimizing the number of storylines are given a higher priority than: the uniformity of said focused vocabularies and minimizing the number of search results included within a storyline.

19. The program storage device in claim 15, wherein search results are listed in said storylines in the order of relevance of said search results.

20. A service for searching locations on a computer network using a computer, said service comprising:

searching, using said computer, said network based on a query to produce search results; and reorganizing, using said computer, said search results into storylines by:

identifying, using said computer, focused vocabularies from said search results, wherein each focused vocabulary forms a separate storyline;

maximizing, using said computer, the number of search results that are included in each storyline;

minimizing, using said computer, the number of search results that are included in multiple storylines; and minimizing, using said computer, the number of storylines, wherein said process of identifying focused vocabularies comprises evaluating distributions of terms within said search results and grouping search results with similar distributions together into said storylines, wherein said process of evaluating distributions of said terms creates cliques of terms, and wherein search results that have more than a predetermined percentage of terms of a given clique are grouped together.

21. The service in claim 20, wherein said process of minimizing the number of storylines comprises adjusting the level of uniformity of said distributions.

22. The service in claim 20, wherein said process of minimizing the number of storylines comprises adjusting the number of cliques produced by said process of evaluating distributions of terms.

23. The service in claim 20, wherein the processes of maximizing the number of search results included within each storyline and minimizing the number of storylines are given a higher priority than: the uniformity of said focused vocabularies and minimizing the number of search results included within a storyline.

24. The service in claim 20, wherein search results are listed in said storylines in the order of relevance of said search results.

* * * * *